US012463440B2

(12) United States Patent
Prasad et al.

(10) Patent No.: US 12,463,440 B2
(45) Date of Patent: Nov. 4, 2025

(54) WIRELESS WEARABLE PENDANT AND ACCESSORY CHARGER WITH MULTIPLE DOORS

(71) Applicant: Blyngz Luxury Technologies, Inc., Saint Paul, MN (US)

(72) Inventors: Rama Prasad, Hamel, MN (US); Steve Fyten, Hamel, MN (US)

(73) Assignee: BLYNGZ LUXURY TECHNOLOGIES, INC., Saint Paul, MN (US)

( * ) Notice: Subject to any disclaimer, the term of this patent is extended or adjusted under 35 U.S.C. 154(b) by 544 days.

(21) Appl. No.: 18/055,405

(22) Filed: Nov. 14, 2022

(65) Prior Publication Data

US 2023/0155403 A1 May 18, 2023

Related U.S. Application Data

(60) Provisional application No. 63/279,665, filed on Nov. 15, 2021.

(51) Int. Cl.
*H01M 10/46* (2006.01)
*H02J 7/00* (2006.01)
(Continued)

(52) U.S. Cl.
CPC ........ *H02J 7/0044* (2013.01); *H02J 7/00034* (2020.01); *H02J 50/005* (2020.01); *H04R 1/1025* (2013.01); *H04R 2460/17* (2013.01)

(58) Field of Classification Search
CPC .... H02J 7/0044; H02J 7/00034; H02J 7/0042; H02J 50/005; H04R 1/1016; H04R 2460/17
(Continued)

(56) References Cited

U.S. PATENT DOCUMENTS 9,532,128 B2   12/2016  Lindén et al.
10,735,842 B2   8/2020  Prasad et al.
(Continued)

FOREIGN PATENT DOCUMENTS

CN   206136197 U   *  4/2017
KR   20220109755 A   *  8/2022   ............ H02J 50/005
(Continued)

*Primary Examiner* — Edward Tso
(74) *Attorney, Agent, or Firm* — GRUMBLES LAW PLLC; Bryan Kravis

(57) ABSTRACT

A wireless wearable pendant and accessory charger with doors is disclosed. The charger includes vertical chambers, a battery, doors, a bottom chamber, a charging unit, and an I/O unit. The wearable audio modules that are worn like earrings include a rechargeable battery that can be charged from the charger battery. The vertical chambers are parallelly connected to the doors. The bottom chamber extends from the bottom end of one of the doors connecting to a bottom end of another plurality of doors. The bottom chamber includes the charging unit coupled to the plurality of earring audio modules to provide power to the earring audio modules. The data storage unit downloads and stores data related to physiological parameters of user and information outputted from a plurality of transducers. The processor processes the stored data to detect events related to activities of the user using artificial intelligence and machine learning algorithms.

19 Claims, 8 Drawing Sheets

PENDANT CHARGER WITH AUDIO MODULES

(51) Int. Cl.
*H02J 50/00* (2016.01)
*H04R 1/10* (2006.01)

(58) Field of Classification Search
USPC .................................. 320/107, 108, 114, 115
See application file for complete search history.

(56) References Cited

U.S. PATENT DOCUMENTS

| | | |
|---|---|---|
| 11,503,400 B2 * | 11/2022 | Wang .................. H04R 1/1025 |
| 2015/0245127 A1 | 8/2015 | Shaffer |
| 2015/0350762 A1 | 12/2015 | Birger et al. |
| 2022/0210541 A1 * | 6/2022 | Wang .................. H04R 1/1025 |

FOREIGN PATENT DOCUMENTS

| | | | | |
|---|---|---|---|---|
| WO | WO-2020238813 A1 * | 12/2020 | ............... | H04R 1/10 |
| WO | WO-2022110419 A1 * | 6/2022 | ............... | H04R 1/10 |

* cited by examiner

PENDANT CHARGER WITH AUDIO MODULES

PENDANT DESIGNS
300
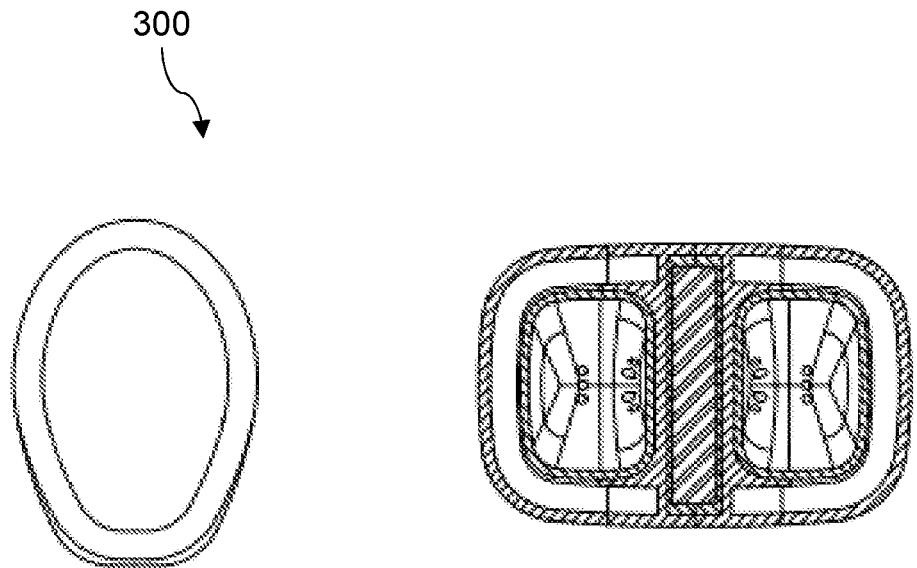
FIG. 3A
FIG. 3B
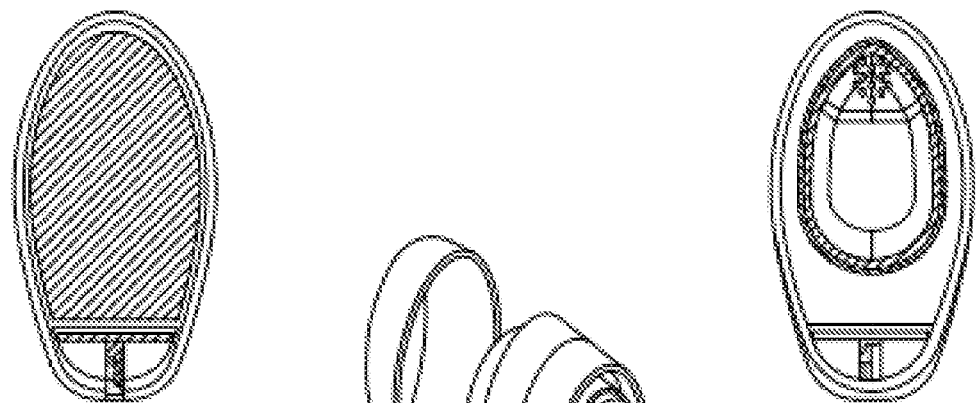
FIG. 3C
FIG. 3D
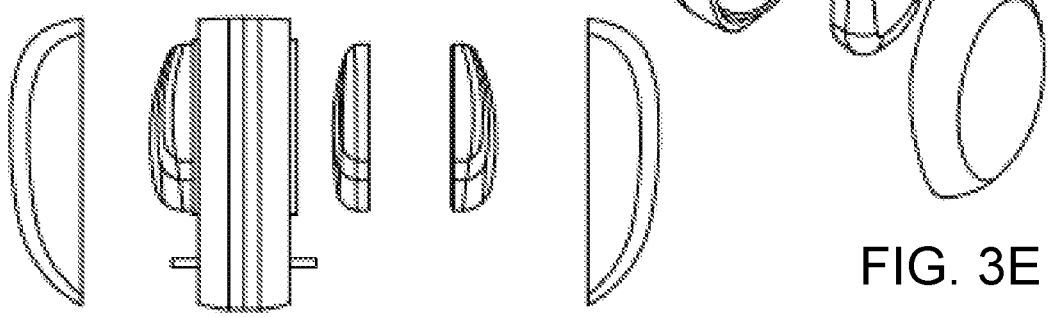
FIG. 3E
FIG. 3F

AUDIO MODULE ELECTRICAL LAYOUT

EARRING AUDIO MODULE WITH HOLDER

ARTISTIC MODULE HOLDER DESIGNS

WIRELESS WEARABLE PENDANT AND ACCESSORY CHARGER WITH MULTIPLE DOORS

CROSS-REFERENCE TO RELATED APPLICATIONS

This Application claims priority from a provisional patent application filed in the U.S. having Patent Application No. 63/279,665 filed on Nov. 15, 2021 and titled "WIRELESS APPAREL AND JEWELLERY CHARGING DEVICE".

FIELD OF INVENTION

This disclosure details elements of a wearable audio device. More specifically, embodiments of the present disclosure relate to a wireless wearable pendant and accessory charger with multiple independent doors for charging a plurality of earring audio modules.

BACKGROUND

Wireless audio earbuds are wireless in-ear audio devices for listening to audio such as music, telephone calls, and the like. Wireless audio devices are in demand as they eliminate tangled wires which causes inconvenience and restricts a user's full range of motion or damage to the device from wire snagging and dislodging. The use of wireless audio earbuds has several features including physical size, convenience, user-friendliness, duration between battery charging, operational reliability, and the perceived acoustic quality of the streamed audio.

The prior art U.S. Pat. No. 9,532,128B2 relates to a storage and charging capsule for a pair of wireless earbuds. The capsule has a power source for charging the pair of wireless earbuds when placed in an earbud chamber.

In an embodiment, another prior art US20150245127A1 relates to a case for a mobile electronic device including an aperture configured to receive one or more earbuds, a portion configured to receive power from a power source, and circuitry configured to simultaneously charge the one or more earbuds and the mobile electronic device.

In another embodiment, another prior art US20150350762A1 relates to a monaural wireless headset that allows a comfortable wearing and a secure holding of the headset when in use. A rechargeable battery is arranged in a main body in such a way that a speaker driver and at least a portion of the rechargeable battery resides on the inward side of a crest of an antitragus when the monaural wireless headset is being worn.

With conventionally-wired earphones, the user typically carries a portable electronic device along with the wired earphones. Wires attached to the earphones often wraps around the portable electronic device, other items in a user's pocket, or around itself to tie itself into tangled knots. Additionally, when the user is using a hands-free audio device, the wire presents a safety issue or is inconvenient. For instance, when jogging, cycling, skiing, or the like, equipment, tools, or even the user's hands or arms are able to catch on the wire and pull the earphones from the user's ears. Also, the audio connector can be torn from its jack on an audio device. The wire can also be too short and pull the device loose causing the device to fall and get damaged.

Therefore, there is need for a wireless wearable pendant charger and accessory charger that offers convenient charging on-the-go and a convenient way to carry and transport the earring audio modules while the earring audio modules are being charged.

SUMMARY

This summary is provided to introduce a selection of concepts, in a simple manner, which is further described in the detailed description of the disclosure. This summary is neither intended to identify key or essential inventive concepts of the subject matter nor to determine the scope of the disclosure.

In accordance with an embodiment of the present disclosure, a wireless wearable pendant charger and accessory charger with a plurality of doors is disclosed. The wireless wearable pendant charger and accessory charger includes vertical chambers, the plurality of doors, a plurality of hinges, a bottom chamber, a charging unit, and an input/output unit.

The vertical chambers that are parallelly connected to a plurality of doors. The plurality of doors are connected to the plurality of hinges at one end of the plurality of doors. The plurality of doors are placed on each side of the vertical chambers. The plurality of doors on each side include a plurality of earring audio modules. The vertical chambers include vertical pockets for placing the plurality of earring audio modules. The bottom chamber extending from a bottom end of at least one of the plurality of doors connecting to a bottom end of another plurality of doors. The bottom chamber is connected to the plurality of doors through the plurality of hinges, which enables the plurality of doors being opened and closed smoothly.

The charging unit is electrically coupled to the plurality of earring audio modules to provide electrical power to the plurality of earring audio modules through charging pins placed at the bottom of the vertical chambers or on the side wall of the central vertical chamber. The charging can also be done wirelessly as well. The charging unit includes a data storage unit and a processor or computing unit. The data storage unit is configured to download and store data related to physiological parameter measurements of a user and information outputted from a plurality of transducers in the earbud module. The processor is configured to process the stored data to detect events or trends related to the user using artificial intelligence and machine learning algorithms. The input/output unit is configured for receiving the electrical power from an external power source. The input/output unit is mounted below the charging unit. The input/output unit is configured to provide both wireless charging and wireless data transfer.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF DRAWINGS

The disclosure will be described and explained with additional specificity and detail with the accompanying figures in which:

FIGS. 3A-3F illustrate exemplary cross sectional views of the wireless wearable pendant and accessory charger such as those shown in FIG. 1 in accordance with an embodiment of the present disclosure;

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION OF THE DISCLOSURE

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure.

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

The terms "comprises", "comprising", or any other variations thereof, are intended to cover a non-exclusive inclusion, such that a process or method that comprises a list of steps does not include only those steps but may include other steps not expressly listed or inherent to such a process or method. Similarly, one or more devices or subsystems or elements or structures or components preceded by "comprises . . . a" does not, without more constraints, preclude the existence of other devices, subsystems, elements, structures, components, additional devices, additional subsystems, additional elements, additional structures or additional components. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

In the following specification and the claims, reference will be made to a number of terms, which shall be defined to have the following meanings. The singular forms "a", "an", and "the" include plural references unless the context clearly dictates otherwise.

Figure 1:
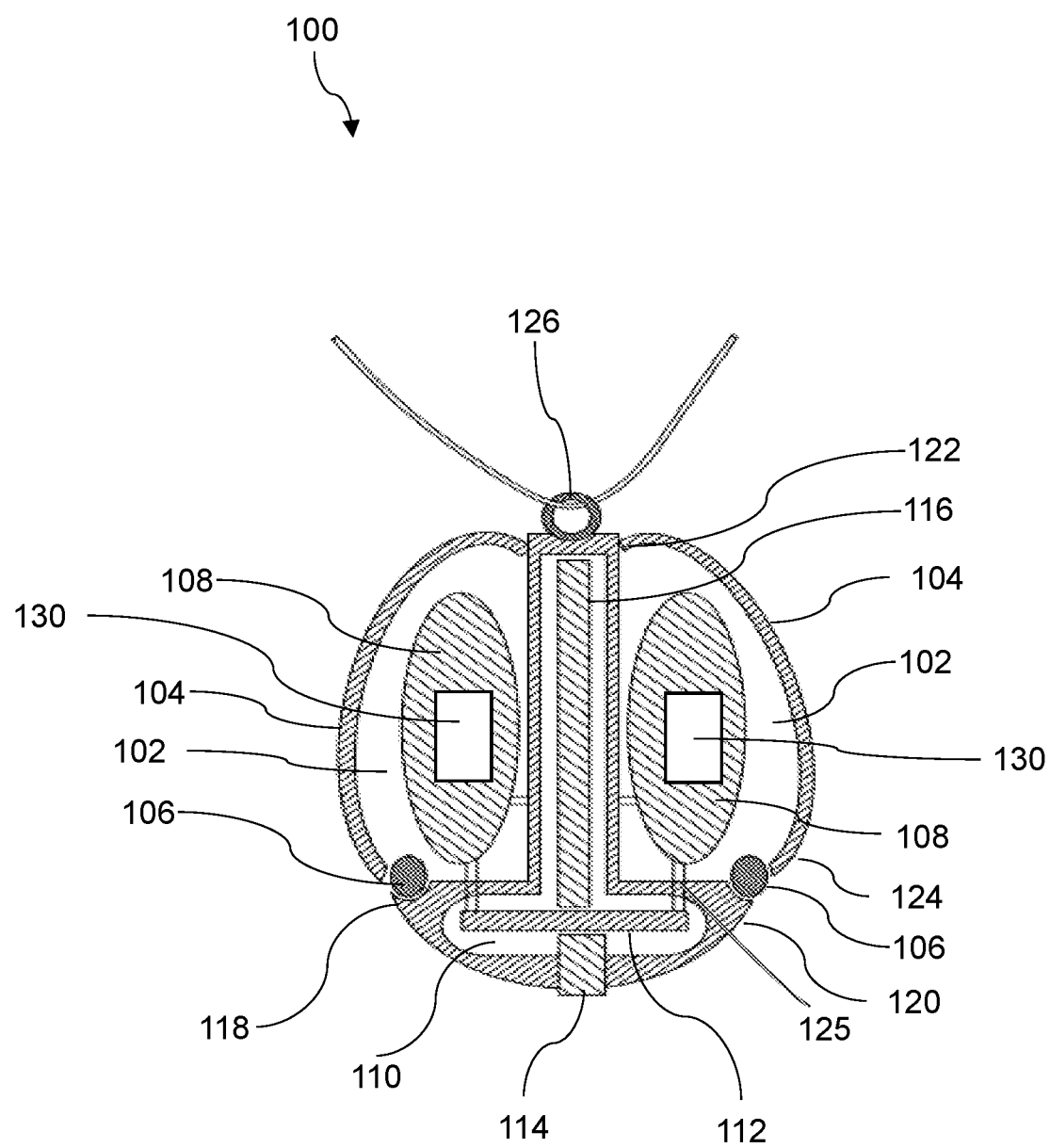
FIG. 1 is a cross-sectional representation illustrating an exemplary wireless wearable pendant and accessory charger in accordance with an embodiment of the present disclosure.

FIG. 1 is a cross-sectional representation illustrating an exemplary wireless wearable pendant charger and accessory charger 100, in accordance with an embodiment of the present disclosure. In an exemplary embodiment of the present disclosure, the wireless wearable pendant charger and accessory charger 100 is shown as a pendant, but other shapes are possible. According to some embodiments, the charger 100 is an accessory or fashion device worn by a user in the form of a broach, pin, or badge. In yet other embodiments, the charger 100 can be carried in a pocket or worn around the neck for convenience. Other embodiments are possible and are not limited by this disclosure. The wireless wearable pendant charger and accessory charger 100 includes vertical chambers 102, a plurality of doors 104, a plurality of hinges 106, a plurality of earring audio modules 108, a bottom chamber 110, a charging unit 112, a, input/output unit 114, a rechargeable charger battery 116, and charging pins 125 that are electrically connected between the charger battery 116 and the modules 108. A rechargeable module battery 130 is located within each earring audio module 108.

In a preferred embodiment, the charger battery 116 is charged prior to usage. The modules 108. Charging can be performed via a wired connection or a wireless charging station at a home or office using a wall cord, laptop connection, and the like. Once in use by the user, including when in motion and not wired to a power source, each module 108 can then be charged by the charger battery 116 by transferring electrical energy from the charger battery 116 to each module battery 130.

The vertical chamber 102 are parallelly connected to the plurality of doors 104. The vertical chambers 102 include a charger battery 116 that is connected to the charging unit 112. In an embodiment, the charger battery 116 and the module batteries 130 are at least one of a lithium-ion battery, a nickel cadmium battery, and other rechargeable battery chemistries. The plurality of doors 104 are mechanically connected with the plurality of hinges 106 at one end (i.e., a bottom end 118, 120) of the plurality of doors 104. In an embodiment, the plurality of hinges 106 are placed at both ends of the plurality of doors 104, which help to open and close the plurality of doors 104 smoothly. In an embodiment, the plurality of doors 104 are arranged vertically in the wireless wearable pendant charger and accessory charger 100.

In an embodiment, the plurality of doors 104 are placed on both sides of the vertical chambers 102. The plurality of doors 104 enclose the plurality of earring audio modules 108. In an embodiment, each of the plurality of doors 104 on each side of the vertical chambers 102 includes at least one earring audio module 108 placed adjacent to the rechargeable battery 116. The plurality of doors 104 are made of a material including at least one of plastic, metal, fabric, and the like. In an exemplary embodiment, the plurality of doors 104 are curved in shape to accommodate the audio modules 108 located inside. In an embodiment, the vertical chambers 102 includes vertical pockets for placing and holding the plurality of earring audio modules 108 securely in place when the doors 104 are closed.

In an embodiment, the plurality of doors 104 open only from one end 122 on either side of the vertical chambers 102. The plurality of doors 104 are mechanically captured at the other end 124 using the plurality of hinges 106. In an exemplary embodiment, the plurality of doors 104 open from a top on either side of the vertical chambers 102 and are mechanically captured at the bottom end using the plurality of hinges 106. Alternatively, the plurality of doors 104 open from the bottom end 124 on either of the side of the plurality of hinges 106 and are locked at the end of the vertical chambers 102.

The bottom chamber 110 is extended from a bottom end 118 of one of plurality of doors 104 connecting to a bottom end 118 of another door 104. The bottom chamber 110 is connected to the plurality of doors 104 through the plurality of hinges 106, which enables the plurality of doors 104 to be opened and closed in a smooth manner. In an embodiment, the bottom chamber 110 includes the charger battery 116.

Continuing with FIG. 1, the charging unit 112 is electrically connected to the plurality of earring audio modules 108 via the charging pins 125. In an embodiment, the charging unit 112 is placed adjacent to the rechargeable charger battery 116. In a specific embodiment, the charger battery 116 is positioned behind the charging unit 112. The plurality of earring audio modules 108 receives the stored power from the charger battery 116 through the charging pins 125. In an embodiment, the charger battery 116 is a part of the charging unit 112.

The input/output unit 114 is mounted below the charging unit 112. The input/output unit 114 is electrically connected to the charging unit 112 to provide electrical power to the charger battery 116. In an embodiment, the input/output unit 114 is designed to receive the power through a power cable via a cable using a universal serial bus (USB), a USB B, a mini USB, a micro USB, a USB C, a USB 3, or other connections. Other embodiments such as wireless charging are possible and are not limited by this disclosure.

According to some embodiments, the wireless wearable pendant charger and accessory charger 100 further includes a fastening ring 126 that is attached to the wireless wearable pendant charger and accessory charger 100, which helps the wireless wearable pendant charger and accessory charger 100 to be worn as a pendant on the user. In an embodiment, the wireless wearable pendant charger and accessory charger 100 can be worn as a chain, a button, brooch, and the like. In an embodiment, the fastening ring 126 includes a top portion and a bottom portion. In an embodiment, the bottom portion of the fastening ring 126 is attached to the vertical chambers 102.

In an embodiment, the shape of the wireless wearable pendant charger and accessory charger 100 includes at least one of a circular shape, an oval shape, a diamond shape, hexagonal, and other 3D shapes capable of holding the plurality of earring audio modules 108. The wireless wearable pendant charger and accessory charger 100 includes a vertical orientation such that the plurality of earring audio modules 108 are loaded into the wireless wearable pendant charger and accessory charger 100 from the top while the user is wearing the charger 100. The charger 100 includes the plurality of doors 104 configured to open independently on either side of the vertical chambers 102. In an exemplary embodiment of the present disclosure, the plurality of doors 104 include two vertical doors 104. Further, the wireless wearable pendant charger and accessory charger 100 supports one or more wireless connection functions such as Bluetooth, Wireless Fidelity (Wi-Fi), and the like.

In an embodiment, the charger battery 116 and the charging unit 112 are interchangeably arranged and can be repositioned to accommodate different configurations. For example, the charging unit 112 is vertically placed within the vertical chambers 102 and the charger battery 116 is arranged adjacent to the charging unit 112. In an embodiment, the plurality of earring audio modules 108 includes charging pins 125 at the bottom of the earring audio modules 108 to connect with the charging unit 112. In another embodiment, the plurality of earring audio modules 108 include the charging pins 125 on the vertical chambers 102 of the plurality of earring audio modules 108 to connect with the charging unit 112 when the charging unit 112 is placed vertically within the vertical chambers 102.

In another embodiment, the charging unit 112 is split into two charging units 112. Each charging unit 112 is individually connected to the plurality of earring audio modules 108. In an embodiment, the two charging units 112 are the same in size. In another embodiment, the two changing units 112 are distinct in size.

Figure 2:
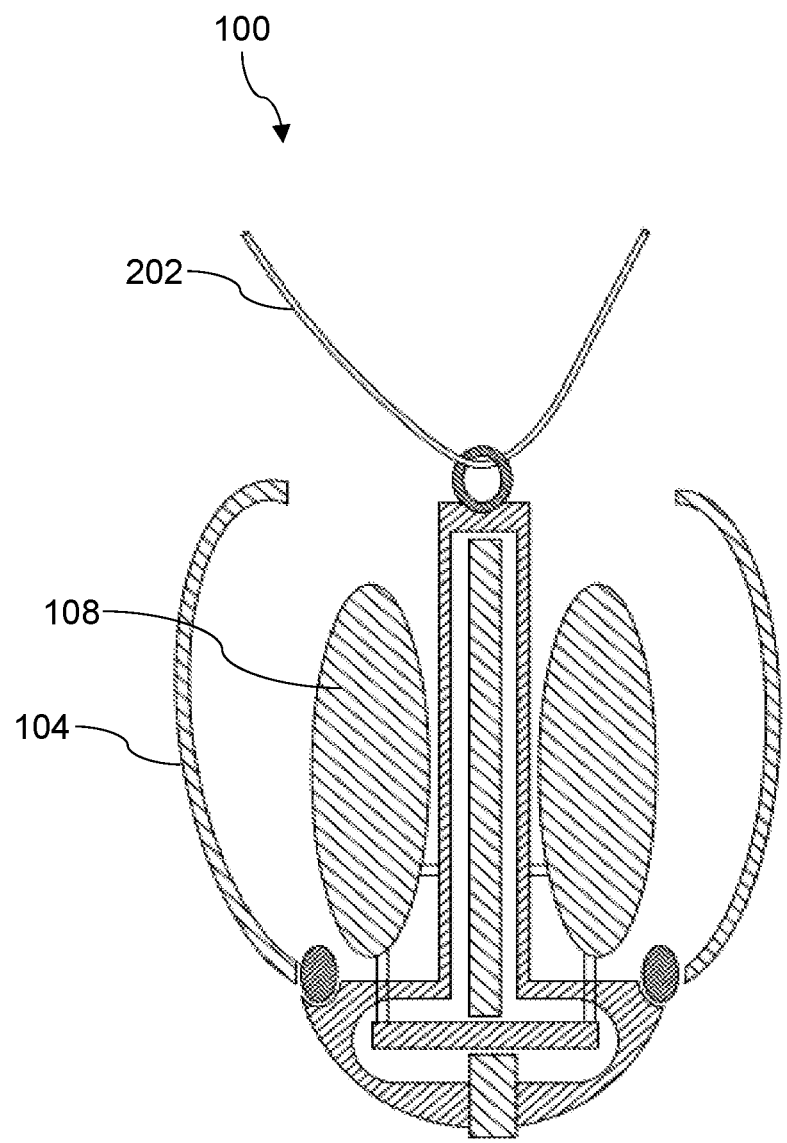
FIG. 2 is a cross-sectional representation illustrating an exemplary open configuration of a plurality of doors to prevent the plurality of earring audio modules from falling during loading such as those shown in FIG. 1 in accordance with an embodiment of the present disclosure.

FIG. 2 is a cross-sectional representation illustrating exemplary open configuration of the charger 100 with a plurality of doors 104 open to allow access to the modules 108. In an exemplary embodiment of the present disclosure, the plurality of doors 104 are opened individually. In an embodiment of the present disclosure, the configuration of the plurality of doors 104 enables the user to charge the plurality of earring audio modules 108. When closed, the plurality of doors 104 prevents the modules 108 from falling out and potentially being damaged or lost while in motion.

FIGS. 3A-3F illustrate exemplary cross sectional and isometric views of different decorative pendant designs 300 of the wearable wireless pendant charger and accessory charger 100, such as those shown in FIG. 1, in accordance with an embodiment of the present disclosure. According to some embodiments, the wireless wearable pendant charger and accessory charger 100 is a pendant which enables charging of the plurality of earring audio modules 108 separately, or one at a time. In another embodiment of the present disclosure, both the earring audio modules 108 are charged at a same time.

Figure 4:
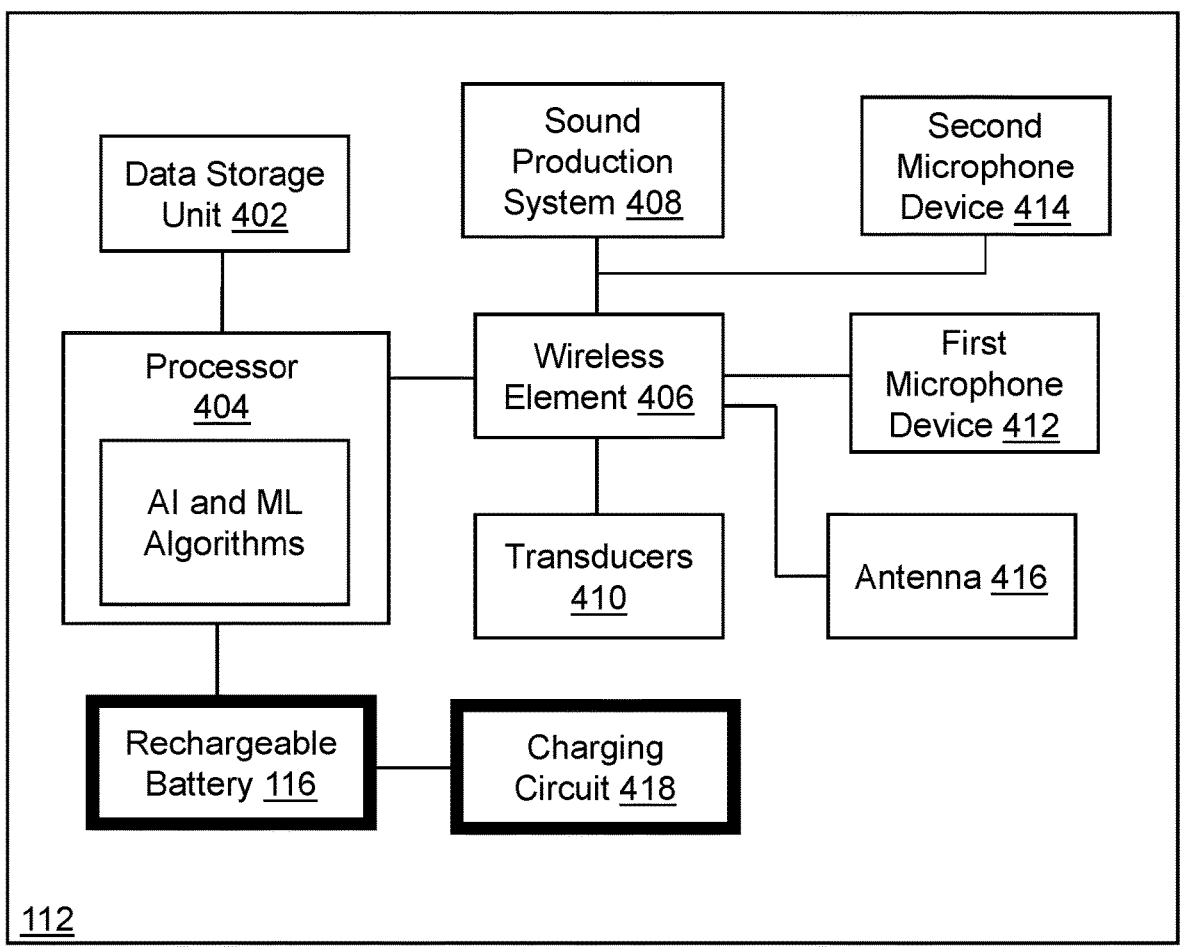
FIG. 4 is a block diagram of a charging unit of the wireless wearable pendant and accessory charger such as those shown in FIG. 1 in accordance with an embodiment of the present disclosure.

FIG. 4 is a block diagram of the charging unit 112 of the wireless wearable pendant charger and accessory charger 100 such as those shown in FIG. 1. The charging unit 112 is a smart charging unit and includes a data storage unit 402 (i.e., a memory), a processor 404, a wireless element 406 (i.e., a Bluetooth communications module), a sound production system 408 (i.e., an audio speaker), one or more transducers 410, a first microphone device 412, a second microphone device 414, a transceiver antenna 416, the rechargeable charger battery 116, and the charging circuit 418.

The data storage unit 402 is configured to download and store data related to physiological parameters and other transducer data from the earring module 108. The processor 404 processes the stored data related to the physiological parameters and other transducer data to detect events and to identify patterns related to activities and condition of the user by implementing artificial intelligence (AI) and machine learning (ML) algorithms. The processor 404 processes the stored data by (a) comparing the stored data related to the physiologies of the user of the earring module 108 and information outputted from the data storage unit 402 with the prestored data, and (b) outputting the events related to the activities of the user based on the comparison of the recently downloaded data with the prestored data using the AI and ML algorithms.

In one embodiment, the data storage unit 402 stores the data related to the physiological parameters and other transducer data including at least one of a user's heart rate trace, blood pressure, and the like. The processor 404 processes the stored data to detect events or to identify patterns related to activities of the user (e.g., heartbeat issues, high blood pressure) by comparing the stored data related to the heart rate and the blood pressure of the user with prestored data using AI and ML algorithms. In one embodiment, the wireless wearable pendant charger and accessory charger 100 acts as an "edge device" which utilizes at least one of the AI and the ML algorithms run on the wireless wearable pendant charger and accessory charger 100 to detect events related to the activities and condition of the user.

The wireless element 406 is used to connect the wireless wearable pendant charger and accessory charger 100 to an external communication device. In an embodiment, the external communication device may include at least one of: a mobile phone, a smartphone, a network, a wearable device, and the like. According to some embodiments, the wireless element 406 is a low energy Bluetooth or WiFi device that is configured to enable communications between the plurality of earring audio modules 108.

The sound production system 408 provides an audio output to the user independent of the plurality of earring audio modules 108. According to some embodiments, the sound production system 408 is a speaker that sends audio and sounds to the user. In an embodiment, the sound production system 408 is positioned towards the user's neck and below the chin. The transducers 410 are configured to perform corresponding one or more functions to include, but not limited to at least one of conversion of biometric measurement of the user into an electric signal, conversion of environmental parameters include air, temperature, humidity and pressure into an electrical signal, and enabling a connection between the wireless wearable pendant charger and accessory charger 100 and an external communication device.

The first microphone device 412 is configured to receive voice signals from the user of the wireless wearable pendant charger and accessory charger 100. The second microphone device 414 is configured to enable noise cancellation capability by isolating the noise from the first microphone device 412 to create enhanced audio signals. The transceiver antenna 416 is configured to transmit and receive wireless signals to and from the audio modules 108, other external wireless devices such as a cell phone, computers, and the charging unit 112.

Figure 5:
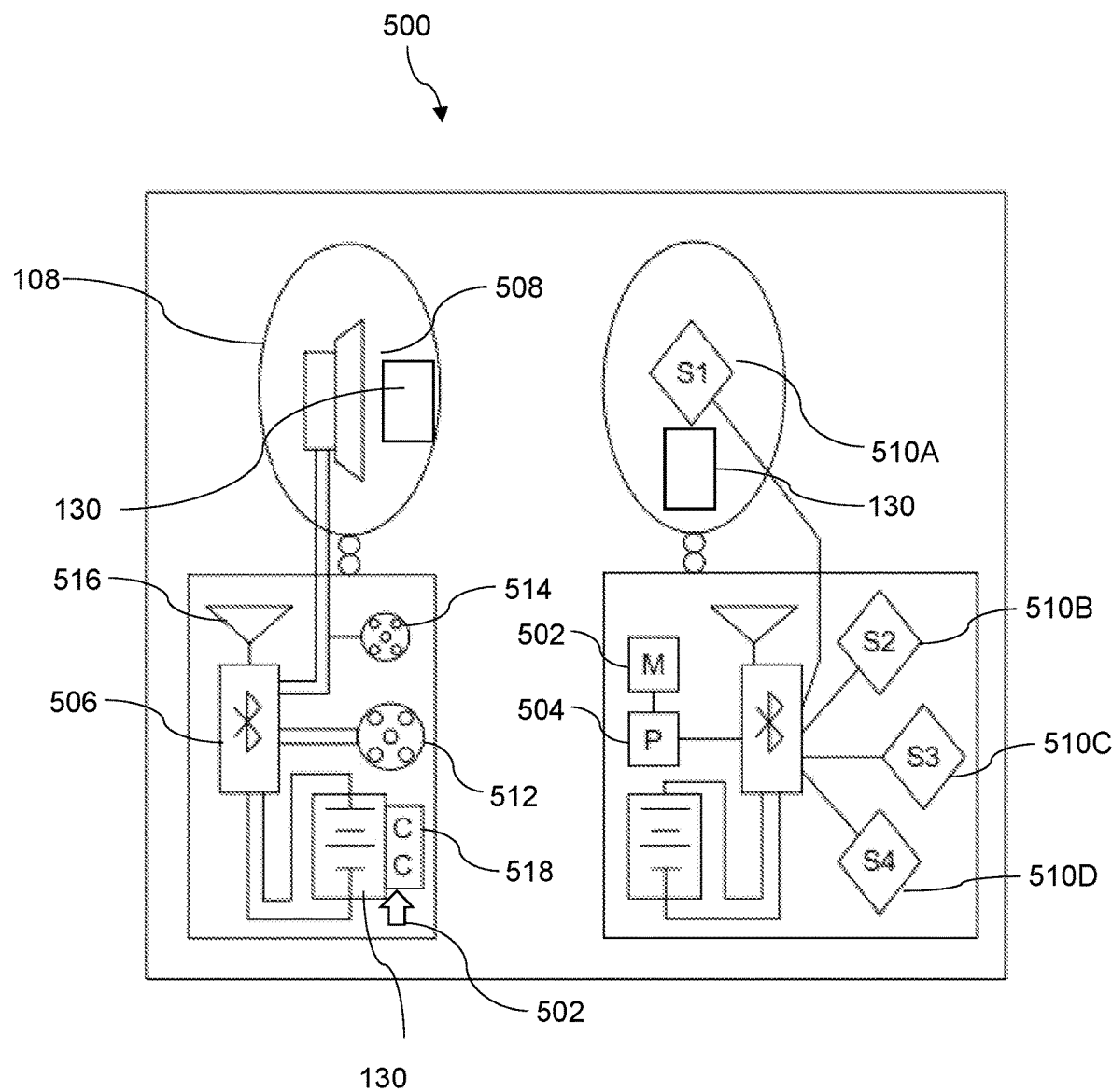
FIG. 5 is a schematic representation of the audio module of FIG. 1 that is charged in the wireless wearable pendant charger and accessory charger in accordance with an embodiment of the present disclosure.

FIG. 5 is a detailed schematic representation 500 of the stereo audio modules 108 of the wireless wearable pendant charger and accessory charger 100, such as those shown in FIG. 1, in accordance with an embodiment of the present disclosure. The audio modules 108 is shown in FIG. 5 in the dangler earring with a two-casing formfactor (reference U.S. Pat. No. 10,735,842 issued August 2020). FIG. 1 shows two audio modules 108 in the stud earring or one-casing form factor. The audio modules 108 includes the sound production system 508 located outside the ear canal on the earlobe and proximate to an intertragical notch of the user's ear. In one embodiment, the sound production system 508 is located outside of the ear canal proximate to the tragus of the ear as shown in FIG. 8. In one embodiment, the sound production system 508 is a cylindrical speaker, or a disc speaker, or a flat array of MEMS speakers or any other shaped sound production system.

The audio module 108 includes the first microphone device 512 located proximate to the ear. The first microphone device 512 is configured to receive voice signals from the user. According to some embodiments, audio module 108 includes the second microphone device 514. The second microphone device 514 is configured to enable noise cancellation by isolating the noise from the first microphone device 512 for clear audio signals.

In some embodiments, the dangler earring audio module 108 includes the audio module battery 130 and the earring charging circuit 518 in the top casing. In such embodiments, the charging circuit 518 is operatively coupled to the audio module battery 130 and is configured to transfer power from charger battery 116 to the audio module battery 130. In another embodiment, the charging unit 112 includes a pin charging system 125 or wireless charging system that charges audio module wirelessly via wireless charging circuit 502.

In one embodiment, the charging unit 112 of the wireless wearable pendant charger and accessory charger 100 includes the Bluetooth device 506. The Bluetooth device 506 is used to communicatively connect the wireless wearable pendant charger and accessory charger 100 to an external communication device. In another embodiment, the Bluetooth device 506 is communicatively coupled to a Bluetooth mesh network.

In addition, the charging unit 112 of the wireless wearable pendant charger and accessory charger 100 also includes the transceiver antenna 516 proximate to the ear. The transceiver antenna 516 is configured to transmit and receive wireless signals. In one embodiment, the transceiver antenna 516 is located proximate to the ear at a distance of at least 1 inch from the brain. In another embodiment, the transceiver antenna 516 is located on a flexible circuit board. In yet another embodiment, the transceiver antenna 516 is enclosed in one or more shielded casings to avoid mechanical and electrical disturbances.

The audio module earring contains in one of the earrings transducers 510A-D configured to employ one or more biometric sensors. The one or more biometric sensors on the earlobe convert the biometric measurement of the user into an electrical signal. In a specific embodiment, the one or more biometric sensors includes at least one of: heart rate sensor, a fingerprint sensor, a voice recognition sensor, and the like.

In another embodiment, the plurality of transducers 410 includes one or more environmental sensors. The one or more environmental sensors convert the environmental parameters including, but not limited to air, temperature, humidity or pressure to an electrical signal. In a specific embodiment, the one or more environmental sensors includes at least one of a temperature sensor, a humidity sensor, a carbon dioxide ($CO_2$) level sensor, an accelerometer, and the like.

In yet another embodiment, the transducers 410 includes a haptic transducer to alert the wearer. In one embodiment, the transducers 410 includes at least one of a heart rate sensor, a skin temperature sensor, an activity monitoring sensor, and the like.

In some embodiments, the charging unit 112 of the wireless wearable pendant charger and accessory charger 100 includes a low energy Bluetooth device (i.e., the wireless element 406). The low energy Bluetooth device 406 is configured to enable the communication with the plurality of earring audio modules 108. In a specific embodiment, the charging unit 112 includes memory (i.e., the data storage unit 402) configured to store data from a duration of time obtained from the transducers 410. In another embodiment, the charging unit 112 includes the processor 404 configured to process data obtained from the transducers 410.

Figure 6A:
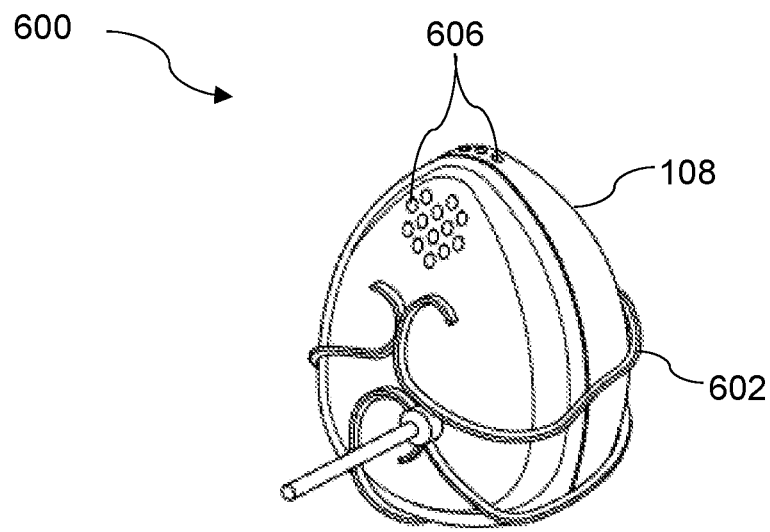
FIGS. 6A-6B illustrate exterior views of an earring holder for holding the plurality of earring audio modules such as those shown in FIG. 1 in accordance with an embodiment of the present disclosure.
Figure 6B:
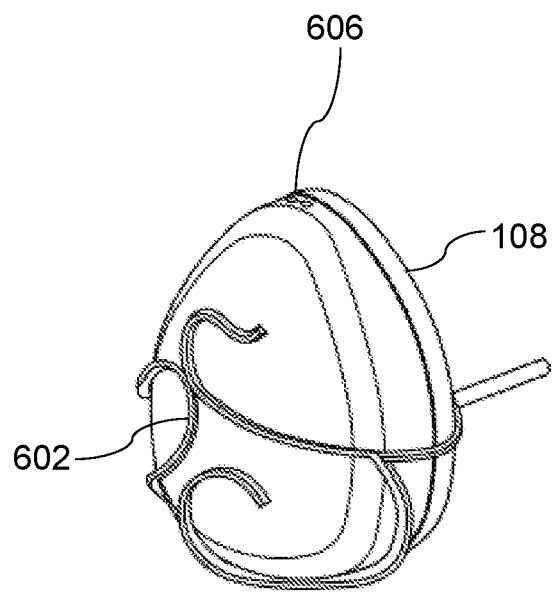

FIGS. 6A-6B illustrate exemplary views 600 of an earring holder 602 for holding the plurality of earring audio modules 108, such as those shown in FIG. 1, in accordance with an embodiment of the present disclosure. The earring audio modules 108 may include an additional set of microphones (e.g., 512, 514 of FIG. 5, not shown), speakers (i.e., the sound production system 508 of FIG. 5), and other transducers (510 of FIG. 5) for backup audio and/or activity tracking function. In an embodiment of the present disclosure, other transducers 510 include at least one of: a speaker, a motion sensor for detecting movement of users, a breathing sensor for detecting breath rate of the user, and exhaled breath composition of the user.

Further, the plurality of earring audio modules 108 are miniaturized Bluetooth modules The plurality of earring audio modules 108 are shaped to fit near or within an earlobe of the user and directs sound into the ear canal. The plurality of earring audio modules 108 rest in the earring holder 602. The earring holder 602 can be comprised of any artistic pattern and shaped to hold the plurality of earring audio modules 108. In an embodiment, the earring holder 602 is made of at least one of: metal, and non-metal including a plastic material, a fiber material, and the like. The audio module 108 includes a plurality of holes 606 on a back side and a top side of the audio module 604 to direct sound towards ear canal. The shape of the audio module 108 is optimized to direct sound towards ear canal most efficiently.

The wireless wearable pendant charger and accessory charger 100 further includes a predefined shape selected from one of a pendant, circular, diamond and other shapes capable of covering the plurality of earring audio modules 108.

FIGS. 7A-7F illustrates a plurality of artistic designs 700 of the earring holders 602 for holding the plurality of earring audio modules 108, such as those shown in FIG. 6, in accordance with an embodiment of the present disclosure. In an embodiment of the present disclosure, the artistic design for the earring holder 602 is sturdy, light weight, and accommodates sound, touch control, and wireless wave transmission from the audio module 108. The primary design of the earring holder 602 has a post that fastens the earring holder to the earlobe through the piercing of the earlobe, with a backing element in the back of the earlobe. The earring holder 602 post may be replaced with at least one of an earring hook, a clip, and other fastening methods to the earlobe.

Figure 7A:
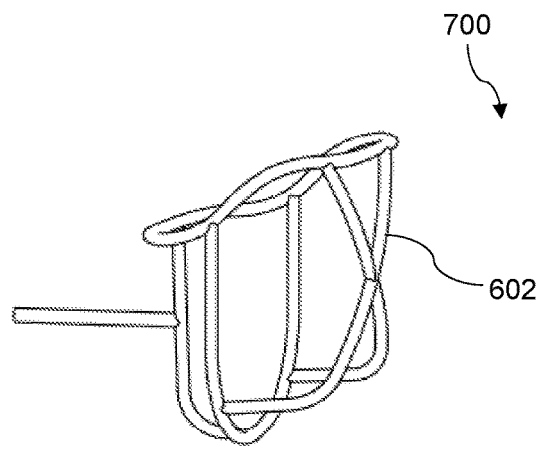
FIGS. 7A-7F illustrates a plurality of artistic designs of the earring holders for holding the plurality of earring modules such as those shown in FIG. 1 in accordance with an embodiment of the present disclosure.
Figure 7B:
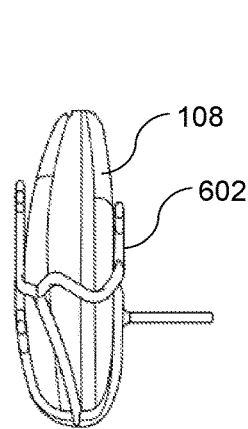
Figure 7C:
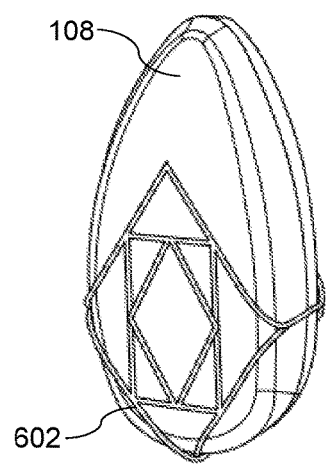
Figure 7D:
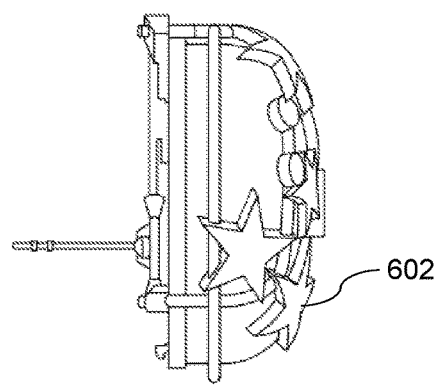
Figure 7E:
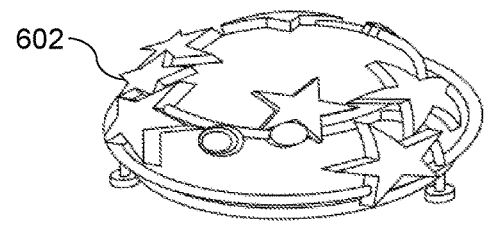
Figure 7F:
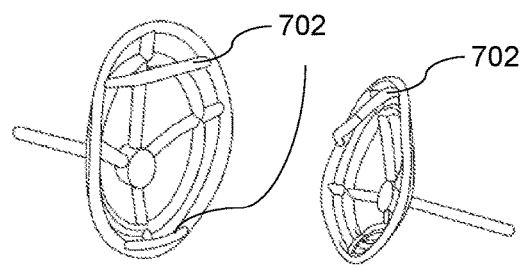
Figure 8A:
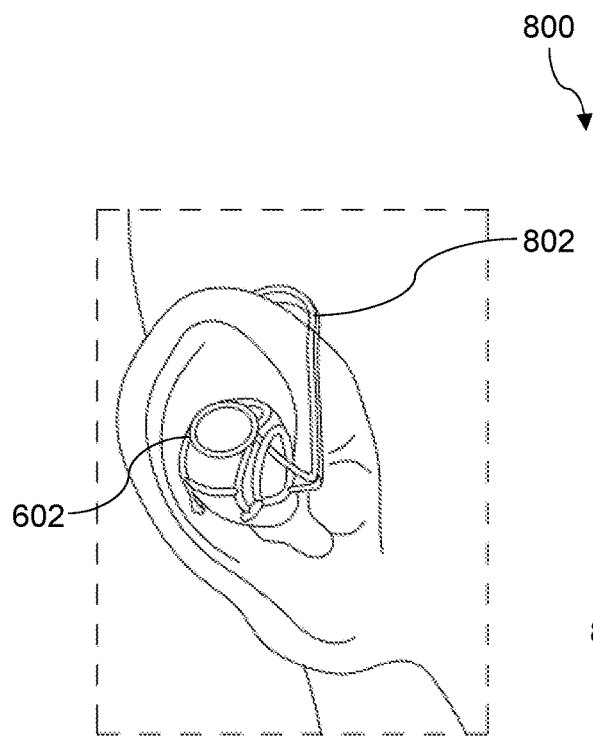
FIGS. 8A-8D are exemplary views depicting the earring holder that is connected with an earlobe clip to a user's ear in accordance with an embodiment of the present disclosure.
Figure 8B:
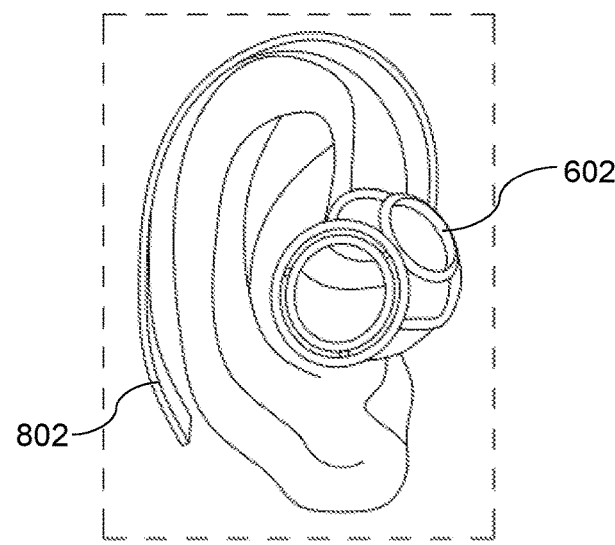
Figure 8C:
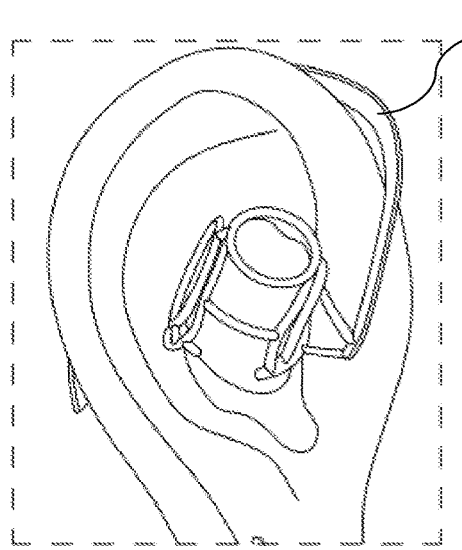
Figure 8D:
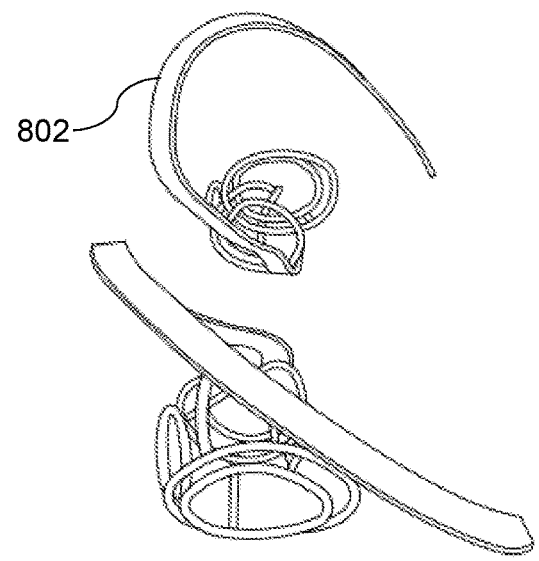

In an embodiment of the present disclosure, the earring holder 602 includes other wire arts, wherein the earring holder 602 accommodates the plurality of earring audio modules 108 and directs a sound towards the ear canal. The wire arts or other types of a thin metal art on the earring holder 602 are limited only by designer's imagination or inspiration, provided the weight limits, touch control, and Bluetooth transmission rules are fulfilled. In an embodiment of the present disclosure, the earring holder 602 material includes a non-metal material. In an exemplary embodiment of the present disclosure, the weight limits of the plurality of earring audio modules 108 and the earring holder 602 earring is less than 4 to 7 grams. FIG. 7F shows the earring holder 602 that includes snap in features 702 which help to hold the plurality of earring audio modules 108. The audio module in this case will have mating slots or holes for snap in.

FIGS. 8A-8D are exemplary views 800 depicting the earring holder 602 connected with over the ear hook 802 and an earlobe clip. The over ear hook 802 over the ear is made up of metal or plastic segment. Not shown is the clip that extends down from holder 602 over the ear lobe and clips on the earlobe. In an embodiment, the earlobe fastener ends in at least one of a post or a hook that goes through the piercing to anchor to the earlobe.

The over ear hook 802 over and behind the ear helix segment and the clip/post/hook across or through the earlobe holds the earring holder 602 that seats the earring audio module 108 securely to the ear. The earring audio module 108 includes a wireless audio circuitry and is oriented and pointed by the earring holder 602 in such a way that the speaker (i.e., the sound production system 508) of the wireless audio circuitry is directed towards the ear canal without being inserted into the ear canal making it more comfortable to wear across variations in ear sizes from person to person. The earring audio module 108 and earring holder 602 can be positioned outside the ear canal or positioned next to the ear canal under the cheek bone near or adjacent to the tragus.

This design of the over ear hook 802 and the earlobe clip or post with the earring holder 602 allows open ear audio that is securely attached to the ear. The over ear hook 802 with the earring holder 602 with earlobe clip can be worn by individuals that do not have pierced earlobes. As the earring audio module 108 is not far from the ear canal the sound production speaker 508 is not too big and power consuming, the earring audio module 108 allows for rechargeable batteries 130 to last for several hours of operation between recharge cycles. The speaker 508 does not need to be loud such that the speaker 508 bothers others around the user wearing the over-ear audio piece. Unique user-specific artwork can be added to the earring holder 602 and other holder segments for design personalization.

In an embodiment of the present disclosure, the wireless wearable pendant charger and accessory charger 100 is of vertical orientation, such that the earrings audio modules 108 are loaded into the wireless wearable pendant charger and accessory charger 100 from the top while a user is wearing the wireless wearable pendant charger and accessory charger 100. The configuration of the plurality of doors 104 enables individual and independent charging of the earring audio modules 108 and prevents the plurality of earring audio modules 108 from falling out while loading into the wireless wearable pendant charger and accessory charger 100.

The wireless wearable pendant charger and accessory charger 100, in addition to charging the earring audio modules 108, can also download and store data related to physiological parameters or other transducer data from the earring audio modules 108. The downloaded and stored data is processed through artificial intelligence and machine learning algorithms to identify patterns or detect conditions that are unique to the individual wearing the smart earrings audio modules 108. The earring audio modules 108 can be put in and taken out of the earring holders 602.

The plurality of doors 104 can open one at a time independently on either side of the pendant 604. The plurality of doors 104 opening from the top where the pendant 604 hangs from a necklace 202 or keychain. The earring holder 602 is made in a plethora of designs and anchors the earring audio modules 108 to the earlobe, including the over the ear and the earlobe clip 802 designs.

Further, the design enables the wireless wearable pendant charger and accessory charger 100 including the earring holder 602. The pendant 100 is able to be worn from the wearable necklace 202 around the neck, a keychain pendant, clipped to shirt, blouse or dress, or as buttoned on to any clothing or wearable accessory including the belt, the wrist band, and the like.

It will be understood by those skilled in the art that the foregoing general description and the following detailed description are exemplary and explanatory of the disclosure and are not intended to be restrictive thereof.

While specific language has been used to describe the disclosure, any limitations arising on account of the same are not intended. As would be apparent to a person skilled in the art, various working modifications may be made to the method in order to implement the inventive concept as taught herein.

The figures and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, the order of processes described herein may be changed and are not limited to the manner described herein. Moreover, the actions of any flow diagram need not be implemented in the order shown; nor do all of the acts need to be necessarily performed. Also, those acts that are not dependent on other acts may be performed in parallel with the other acts. The scope of embodiments is by no means limited by these specific examples.

What is claimed is:

1. A wireless wearable pendant charger with a plurality of doors, the wireless wearable pendant charger comprising:
    vertical chambers that are parallelly connected to the plurality of doors;
    the plurality of doors are connected to a plurality of hinges at one end of the plurality of doors, wherein the plurality of doors are placed on each side of the vertical chambers, wherein the plurality of doors on each side comprises a plurality of earring audio modules, and wherein the vertical chambers comprises vertical pockets for placing the plurality of earring audio modules;
    a bottom chamber extending from a first bottom end of a first door of the of the plurality of doors connecting to a second bottom end of a second door of the plurality of doors, wherein the bottom chamber is connected to the plurality of doors through the plurality of hinges, which enables the plurality of doors being opened and closed smoothly, and wherein the bottom chamber comprises:
        a charging unit electrically coupled to the plurality of earring audio modules to provide electrical power to the plurality of earring audio modules, wherein the charging unit comprises:
            a data storage unit configured to download and store data related to physiological parameters of a user of the wireless wearable pendant charger and accessory charger and information outputted from one or more transducers; and
            a processor configured to process the stored data to detect events related to activities of the user using artificial intelligence and machine learning algorithms; and
        an input/output unit for receiving the electrical power from an external power source, wherein the input/output unit is mounted below the charging unit.

2. The wireless wearable pendant charger of claim 1, further comprising a rechargeable battery that is arranged in at least one of: the vertical chambers and the bottom chamber.

3. The wireless wearable pendant charger of claim 1, wherein the plurality of earring audio modules comprises charging pins at the bottom of the plurality of earring audio modules to connect with the charging unit when the charging unit is placed within the bottom chamber, and wherein the plurality of earring audio modules comprises the charging pins on the vertical chambers of the plurality of earring audio modules to connect with the charging unit when the charging unit is placed within the vertical chambers.

4. The wireless wearable pendant charger of claim 1, wherein processing the stored data comprises:
    comparing the stored data related to the physiological parameters of the user of the wireless wearable pendant charger and information outputted from the transducers with the prestored data; and
    outputting the events related to the activities of the user based on the comparison of the stored data with prestored data using the artificial intelligence and machine learning algorithms.

5. The wireless wearable pendant charger of claim 1, further comprising a button on each side of the plurality of doors, wherein the button is configured for opening the plurality of doors independently to pop out the plurality of earring audio modules from the plurality of doors.

6. The wireless wearable pendant charger of claim 5, wherein the plurality of doors open from one end on either side of the vertical chambers, and wherein the plurality of doors are locked at another end by the plurality of hinges.

7. The wireless wearable pendant charger of claim 1, wherein the charging unit comprises a wireless element that is configured to communicatively connect the wireless wearable pendant charger to an external communication device, wherein the external user device comprises at least one of a mobile phone, a smart phone, and a computer.

8. The wireless wearable pendant charger of claim 1, wherein the charging unit comprises at least one of:
    a first microphone device located proximate to a base of the neck, wherein the first microphone device is configured to receive voice signals from the user;
    a second microphone device configured to enable noise cancellation by isolating noise from the first microphone device for clear voice signals;
    a sound production system configured to provide an audio output to the user;
    a transceiver antenna configured to transmit and receive wireless signals from an external communication devices; and
    the transducers are configured for at least one of storing of an audio signal and an activity tracking function.

9. The wireless wearable pendant charger of claim 1, wherein the transducers comprises at least one of:
    one or more biometric sensors for converting biometric measurement of the user into an electrical signal, wherein the one or more biometric sensors comprises at least one of: a face recognition sensor, a fingerprint sensor, an iris recognition sensor, a heart rate sensor, a skin temperature sensor, a motion sensor, a breathing sensor, and a voice recognition sensor; and one or more environmental sensors for converting the environmental parameter into an electric signal, wherein the one or more environmental sensors comprises at least one of a temperature sensor, a humidity sensor, and a carbon dioxide ($CO_2$) level sensor.

10. The wireless wearable pendant charger of claim 1, wherein the wireless wearable pendant and accessory charger comprises a predefined shape selected from one of: a pendant, a circle, a diamond, and other shapes capable of covering the plurality of earring audio modules.

11. The wireless wearable pendant charger of claim 1, wherein the pendant is worn as at least one of a wearable necklace around a neck, a keychain, attached to a shirt, a blouse, a dress, buttoned onto clothing, and as a wearable accessory comprising at least one of: a belt and a wrist band.

12. An earring holder comprising:
a mechanical support structure; and
one or more earring audio modules, wherein
   the mechanical support structure is shaped to hold the earring audio modules proximate to an ear canal of a user, and wherein
   the earring audio module is mechanically held in place in the structure using any one of a basket, a spring tension, a snap fastener, and a clip;
a sound production system configured to provide an audio output to the user from near a top of the user's earlobe or at the intertragic notch or the tragus and directed towards the ear canal;
a first microphone device located proximate to the ear lobe of the user, wherein the first microphone device is configured to receive voice signals from the user;
a second microphone device configured to enable noise cancellation by isolating noise from the first microphone device for clear voice signals;
a transceiver antenna configured to transmit and receive wireless signals from an external communication device; and
a transducer for sensing sound is configured for at least one of storing of an audio signal and an activity tracking function.

13. The earring holder of claim 12, wherein the earring holder is positioned next to the ear canal of the user on the earlobe at or around the intertragic notch, or under the cheek bone adjacent to a user's tragus.

14. The earring holder of claim 12, wherein the earring holder is made of at least one of metal, plastic, and phenolic material.

15. The earring holder of claim 12, wherein the earring audio module is configured to perform at least one of function of snapping in and being encased in the structure.

16. The earring holder of claim 12, further comprising an earlobe clip that is coupled to the earring holder, wherein the earlobe clip extends down over the user's earlobe ending to clip on the user's earlobe.

17. The earring holder of claim 12, further comprising an input/output unit located in the earring audio module for receiving electrical power from an external power source during charging cycles.

18. The earring holder of claim 12, further comprising a rechargeable battery.

19. The earring holder of claim 12, further comprises a wireless element located in the earring audio module that is configured to communicatively connect the earring audio module to an external communications device, wherein the external communications device comprises at least one of a mobile phone, a smart phone, a computer or a wireless network.

\* \* \* \* \*